United States Patent
Leidig et al.

(10) Patent No.: US 12,077,217 B2
(45) Date of Patent: Sep. 3, 2024

(54) SEALING PLUG

(71) Applicant: ILLINOIS TOOL WORKS INC., Glenview, IL (US)

(72) Inventors: Christoph Leidig, Rothenburg ob der Tauber (DE); Jan Müller, Würzburg (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 1065 days.

(21) Appl. No.: 16/985,601

(22) Filed: Aug. 5, 2020

(65) Prior Publication Data

US 2021/0046979 A1    Feb. 18, 2021

(30) Foreign Application Priority Data

Aug. 16, 2019  (DE) .......................... 102019122038.6
Jul. 15, 2020   (EP) ..................................... 20185916

(51) Int. Cl.
*B62D 25/24* (2006.01)
*F16J 13/12* (2006.01)

(52) U.S. Cl.
CPC .............. *B62D 25/24* (2013.01); *F16J 13/12* (2013.01)

(58) Field of Classification Search
CPC .................................. B62D 25/24; F16J 13/12
See application file for complete search history.

(56) References Cited

U.S. PATENT DOCUMENTS

| 4,290,536 A * | 9/1981 | Morel ...................... F16J 13/00 220/795 |
| 6,319,436 B1 | 11/2001 | Jaeger |
| 7,997,437 B2 * | 8/2011 | Jatzke .................... B62D 25/24 220/359.4 |
| 2004/0232159 A1 * | 11/2004 | Kraus .................... B62D 29/04 220/802 |
| 2012/0097337 A1 * | 4/2012 | Dominguez ........... B62D 25/24 156/391 |

(Continued)

FOREIGN PATENT DOCUMENTS

| CN | 206938651 U | 1/2018 | |
| DE | 20107612 U1 | 10/2001 | |
| DE | 202009003473 U1 * | 7/2009 | ............. B62D 25/24 |

(Continued)

OTHER PUBLICATIONS

English translation of JP-2013217448-A. (Year: 2023).*
Translation of JP-S6159067-A from Espacenet. (Year: 2024).*
Translation of JP-2834767-B2 from Espacenet. (Year: 2024).*

*Primary Examiner* — James N Smalley
(74) *Attorney, Agent, or Firm* — THOMPSON HINE LLP

(57) ABSTRACT

A closing plug for closing holes in objects, in particular for closing holes in vehicle bodies, wherein the closing plug has at least one first circumferential wall which encloses a cavity, wherein a transverse wall is present in the cavity between the circumferential side wall, which transverse wall has an outer shape which corresponds to the shape of the cavity and is attached to the side wall in a circumferential manner, wherein, for the purpose of reinforcing the circumferential wall against yielding outward or inward, at least one reinforcement rib extends transversely through the cavity and so as to connect opposite regions of the circumferential side wall.

7 Claims, 6 Drawing Sheets

(56) References Cited

U.S. PATENT DOCUMENTS

2014/0361015 A1  12/2014  Weiler
2015/0135598 A1   5/2015  Jatzke

FOREIGN PATENT DOCUMENTS

| DE | 102009057750 A1 |   | 12/2010 |
|----|-----------------|---|---------|
| DE | 102013105925 A1 |   | 12/2014 |
| EP | 2810855 A1      |   | 12/2012 |
| EP | 2781806 A1      |   | 9/2014  |
| EP | 2873894 A1      |   | 5/2015  |
| JP | S6159067 A      | * | 3/1986  |
| JP | 2834767 B2      | * | 12/1998 |
| JP | 2013217448 A    | * | 10/2013 |
| JP | 6159067         |   | 7/2014  |

* cited by examiner

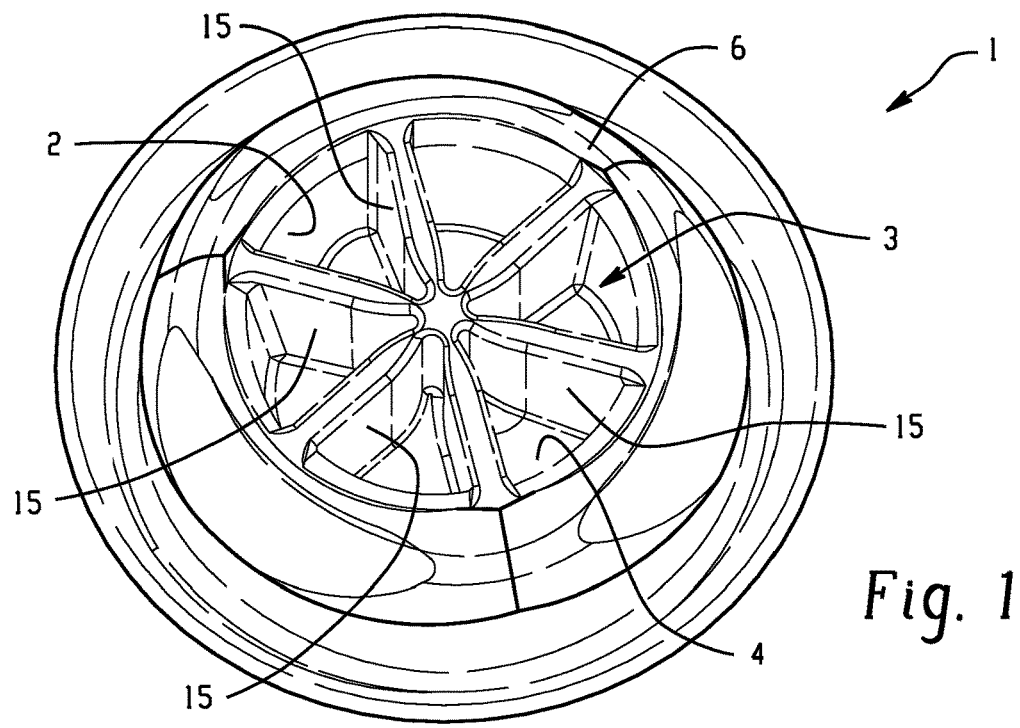
Fig. 1
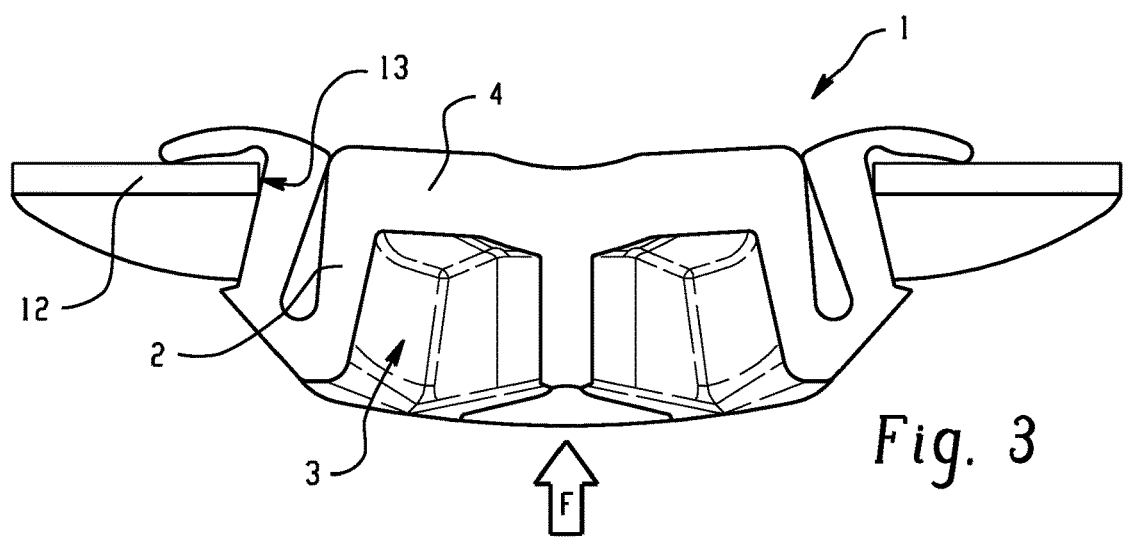
Fig. 2
Fig. 3

SEALING PLUG

TECHNICAL FIELD

The invention relates to a sealing plug or closing plug for holes in objects, in particular for holes in vehicle bodies.

BACKGROUND

In particular in vehicle bodies, a multiplicity of holes and apertures are provided in order to make vehicle cavities, such as for example the sillboards, accessible from outside, in particular to make them accessible for the ingress of a corrosion prevention agent.

The body as a whole is usually subjected to phosphating in a phosphating bath already early in the production of a motor vehicle. After this, washing in a cleaning bath and then usually a cataphoretic dip-coating take place.

For all these processes, it is necessary for the corresponding liquids also to pass into the cavities of a body. For this purpose, the body has openings and in particular holes which subsequently should be closed, in order to prevent the ingress of dirt and liquids.

In addition, vehicle bodies also have holes which serve to realize the process of producing an alignment of individual body components up until their integration into the body as a whole.

The known holes or openings are usually closed with resiliently elastic plugs. For this purpose, customary resiliently elastic plugs have a central cavity in the form of a flat cup-like or bowl-like region which is delimited by a first side wall, and a customary first wall which terminates this region on one side.

Two walls usually branch off from an end of the side walls that is opposite the termination, which two walls run obliquely outward and reach back for example as far as the level of the termination, such that this wall region is approximately V-shaped in cross section and corresponds to an annular groove in the plan view from the bottom side. A circumferential sealing lip branches off usually outward from a free end of the outer wall and, in the plugged-in state, rests on a body sheet, while the circumferential wall, which is V-shaped in cross section, passes through the hole. In order to achieve an anchoring, on the outer wall there can also be an outwardly projecting step which is ring-like or arrow-like in cross section and prevents the action of slipping out from the opening.

FIGS. 15-19 show such a prior art.

It can be seen in FIG. 19 that pressure has to be exerted on the central region of the bottom of the bowl-like element during the assembly of such a plug. As can be seen clearly in FIG. 19, this leads to a spreading of the outer wall such that ultimately the plug widens or, if it is already partially arranged in a hole, exercises a pressing action on the hole edges. This makes assembly more difficult.

U.S. Pat. No. 6,319,436 B1 discloses a closing plug for closing an opening in a planar surface, having a plurality of retaining hooks and a circumferential seal, wherein ribs which are formed as guide elements for plugging in the plug branch off from a bottom side of a transverse surface of the plug. Here, the plug is formed from a rigid plastic.

JP 61-59067 discloses a plug for closing holes in planar objects, wherein said plug is formed from an elastic material and has a first inner circumferential wall which, in one embodiment, has a circumferential step on the outside and a sealing lip which interacts with said step, and by these means can correspondingly close a hole. In addition, the plug may have a wave-like form in cross section and have a top-side circumferential V-shaped groove in which four ribs are formed.

US 2015/0135598 A1 discloses a resiliently elastic plug which consists of a circumferential wall and a top-side sealing lip formed from said circumferential wall, wherein an inner, dome-like extension is arranged on an inner circumferential surface of the wall, wherein the top of the dome-like extension is formed by ribs In the case of said resiliently elastic plug, it is disadvantageous that the problems of the prior art, specifically the yielding of this wall outward or inward during assembly or disassembly, are not eliminated owing to the merely linear engagement of the dome-like element on the circumferential wall.

SUMMARY

It is the object of the invention to provide a closing plug which ensures improved capacity for assembly and improved sealing.

The closing plug according to the invention has a central cavity enclosed by a first wall and is preferably formed with a reinforcement structure such that an inner circumferential first wall has increased stiffness against yielding outward or inward.

Consequently, in particular the bowl-like inner structure, which delimits the cavity, of the closing plug is reinforced such that, on the one hand, the spring forces formed by the wall arrangement that is V-shaped in cross section are increased and last longer and, on the other hand, nonetheless assembly is facilitated and disassembly is made more difficult, because the region to be plugged in and in particular a bottom circumferential edge, in which the two side walls converge, do not become spread out so far that they prevent the closing plug from being plugged into a hole. By contrast, contraction of the side walls can be reduced as a result of the reinforcement, thereby leading to an improved holding force of the plug.

According to the invention, the reinforcement can take place in a number of ways.

A first possible reinforcement consists in fabricating the plug from two components, in which one component, from which the bowl-like element is formed, is formed of a stiffer material than the outer wall, wherein the inner and outer material are preferably produced in one process step and differ merely in terms of their material properties.

A further possibility consists in forming an annular element, which provides increased stiffness, on the inner wall from the inside of the bowl or from the outside of the bowl, i.e. pushed into the V-shaped groove, or from both sides.

Preferably provided inside the cavity, i.e. between the inner circumferential wall, is a rib structure with at least one rib which crosses the cavity and optionally reaches to a transversely running wall which closes the cavity. Such a solution is simple, effective and inexpensive. The closing plug is formed here from an elastic, in particular resiliently elastic, material.

It is thus essential that additional compressive and tensile stress-absorbing elements which bring about reinforcement of the plug are present.

It is thus also essential that a structure is provided which makes it possible for the outer circumferential wall to still be able to resiliently yield, whereas the inner circumferential wall has reduced yielding and increased stiffness.

The invention thus in particular relates to a closing plug for closing holes in objects, in particular for closing holes in vehicle bodies, wherein the closing plug has at least one first circumferential wall which encloses a cavity, wherein a transverse wall is present in the cavity between the circumferential side wall, which transverse wall has an outer shape which corresponds to the shape of the cavity and is attached to the side wall in a circumferential manner, wherein, for the purpose of reinforcing the circumferential wall against yielding outward or inward, at least one reinforcement rib extends transversely through the cavity and so as to connect opposite regions of the circumferential side wall.

Advantageously, there are a plurality of ribs.

In the case of the invention, in particular, the transverse wall can be arranged in the region of a circumferential edge of the circumferential side wall or be arranged at any desired point of the circumferential side wall axially between the free edges, wherein, given the arrangement of the transverse wall in the region of the circumferential edges and in particular so as to terminate with said edges, a cup-, bowl- or trough-like structure is formed or, given an arrangement between the circumferential edges, the cavity is subdivided into partial cavities in a symmetrical or asymmetrical manner.

It is advantageous if, given an arrangement of the transverse wall in the region of one of the circumferential edges, at least one rib extends from that surface of the transverse wall which faces the cavity in the direction of the axially opposite circumferential edge.

In one configuration, it is advantageous that, when the transverse wall subdivides the cavity between the edges into partial cavities in a symmetrical or asymmetrical manner, one of the partial cavities has a transverse rib arrangement comprising at least one rib or both partial cavities have a transverse rib arrangement comprising at least one rib.

It is further advantageous if a central, axial extension is formed in the region of a longitudinal center of the cavity or the partial cavities, the ribs being formed between said extension on the one hand and the inner surface of the circumferential wall on the other hand.

In a further embodiment, an annular coaxial rib is arranged coaxially around the longitudinal center of the cavity or the partial cavities, the ribs being guided outward radially in relation to the inner surface of the wall from said annular coaxial rib.

In this way, it can be advantageous that the annular rib and/or the central extension project over a partial quantity of the axial length between the transverse wall and a respective circumferential edge or over the entire height up to a circumferential edge or beyond.

In a further advantageous embodiment, the projections or the annular ribs are arranged so as to project into the partial cavities given cavities and partial cavities on either side of the transverse wall.

Further advantageous embodiments provide that the ribs have, over their radial extent, a uniform height, a height which decreases radially outward or increases radially outward or a varying height in an axial center of the cavity toward a circumferential wall.

Finally, in one embodiment, an outer circumferential side wall can branch off from one of the circumferential edges of the circumferential side wall obliquely outward in the direction of other circumferential edges, said outer circumferential side wall diverging from the first inner circumferential wall, wherein a sealing lip branches off from a free end edge of the second circumferential wall obliquely outward and against its direction of extent.

In a further advantageous embodiment, the sealing lip can be formed at least in subregions from a heat-activatable adhesive material or comprises such a material on a surface which faces a body, in order to adhesively bond the sealing lip and the body given suitable heat treatment.

According to a further advantageous embodiment, the closing plug is provided for closing holes in objects, in particular for closing holes in vehicle bodies, wherein the closing plug preferably has at least one first circumferential wall which encloses a cavity, wherein a transverse wall is present in the cavity between the circumferential side wall, which transverse wall has an outer shape which corresponds to the shape of the cavity and is attached to the side wall in a circumferential manner. This closing plug can comprise the abovementioned features in combination with their technical effect.

The closing plug is distinguished in that it is formed as a 1-component structural part in one piece or completely from a heat-activatable adhesive material.

A TPE material or a material having adhesive properties at relatively high temperatures of e.g. 110° C. to 195° C. may be provided as the heat-activatable adhesive material for the 1-component adhesive closing plug. Such a material may also be a hotmelt or hotmelt adhesive material.

The adhesive properties may be provided at temperatures of 110° C. or 120° C. or 130° C. or 140° C. or 150° C. The adhesive properties may be provided at temperatures up to 155° C. or 165° C. or 175° C. or 185° C. or 195° C.

Since the closing plug (hotmelt plug) is formed completely from a single heat-activatable adhesive material, this facilitates recycling, because only a single material has to be recycled.

A closing plug of this type makes it possible to cover higher ranges of sheet metal thickness. The closing plug is suitable for a very high range of sheet metal thickness of e.g. 0.7 mm to 5 mm. It is possible to cover large hole diameters with tolerances above e.g. ±0.5 mm.

In addition, it is possible to reduce the number of parts, since the closing plug can be used or provided as a 1-component assembly plug or stopper, e.g. in an assembly line, or as an adhesive peg, e.g. in a paint shop.

The closing plug is also distinguished by improved ergonomics, as a result of a modified introduction of force, and less deformation. Significantly improved assembly feedback during manual installation is provided. A pushing action through a through-opening can be prevented with such a closing plug. In addition, an improved holding force is provided.

The closing plug has an impermeability to water up to 500 mm water column.

Furthermore, a closing plug is provided which is produced by a 1-component injection molding method from a heat-activatable adhesive material.

In particular, a method for producing a closing plug by means of a 1-component injection molding method from a heat-activatable adhesive material is also provided.

The closing plug being formed in one piece means that simplified automation and higher process reliability are possible.

BRIEF DESCRIPTION OF THE DRAWINGS

The invention is explained by way of example with reference to a drawing,
in which:
FIG. 1: shows a first embodiment of a closing plug according to the invention in a perspective view from below;
FIG. 2: shows a closing plug according to FIG. 1 in cross section, showing the force profile during assembly;

FIG. 3: shows a closing plug according to FIG. 2 in cross section, showing the introduction of force during disassembly;

DETAILED DESCRIPTION

Figure 4:
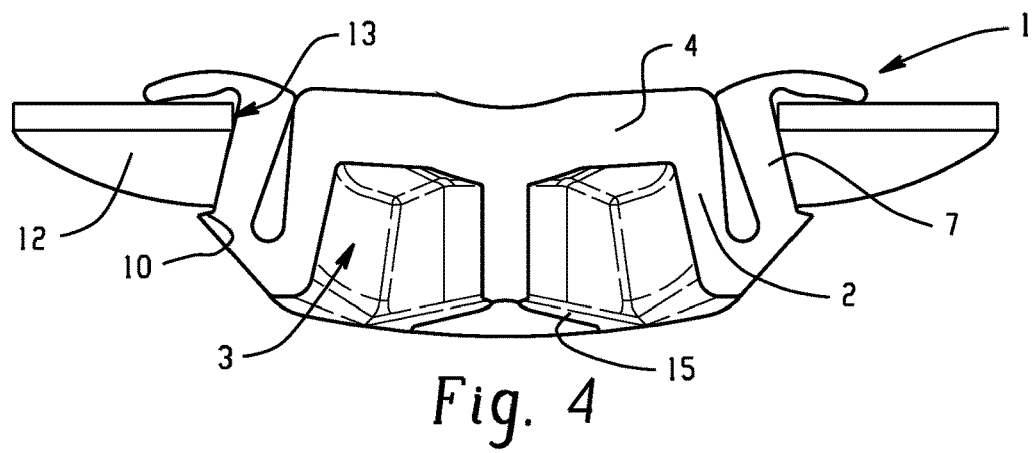
FIG. 4: shows the closing plug according to FIG. 3 in cross section, showing improved sealing properties.

A closing plug 1 according to the invention has a first circumferential side wall 2 which encloses a cavity 3.

A transverse wall 4 is provided in the cavity 3 such that it is delimited from the circumferential side wall 2, said transverse wall having an outer shape which corresponds to the shape of the cavity 3.

The circumferential side wall 2 has a first circumferential free edge 5 and a second circumferential free edge 6 which are present at diametrically opposite ends of the wall 2.

Figure 11:
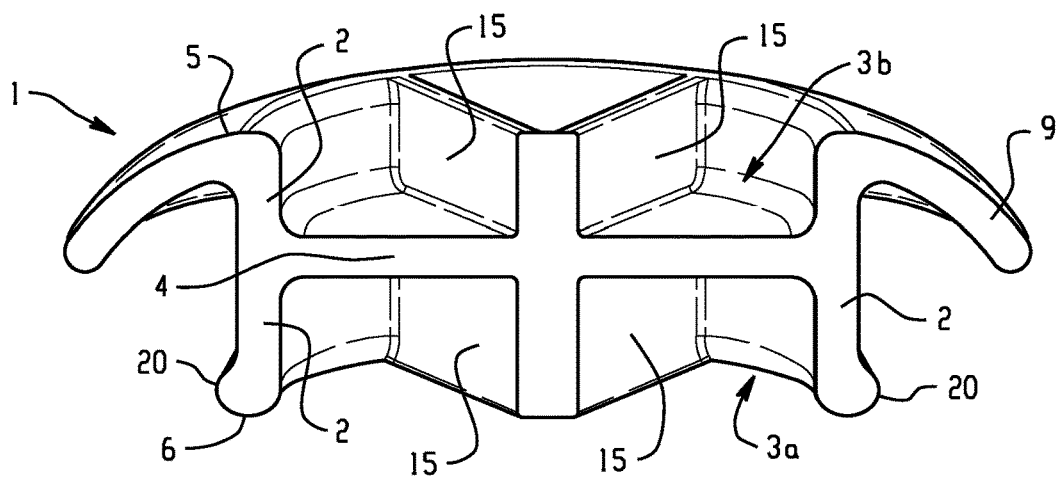
FIG. 11: shows the plug according to FIGS. 9 and 10 in cross section.

The transverse wall 4 can be arranged respectively in the region of one of the circumferential edges 5, 6 or at any desired point of the circumferential side wall 2 between the free edges 5, 6 (FIG. 11).

In the case in which the transverse wall 4 is arranged in the region of the circumferential edges 5, 6, in particular so as to terminate with said edges, a cup-, bowl- or trough-like structure is thus formed, whereas, given an arrangement between the circumferential edges 5, 6, the cavity 3 is subdivided into partial cavities 3a, 3b in a symmetrical or asymmetrical manner.

An outer circumferential side wall 7 can branch off from a circumferential second edge 6 of the circumferential side wall 2, in particular obliquely outward in the direction of the first circumferential edge 5, said outer circumferential side wall diverging from the first inner circumferential wall 2.

The second circumferential outer wall 7 extends for example as far as the level of the first circumferential edge 5.

A sealing lip 9 branches off from the free end edge 8 of the second circumferential wall 7 obliquely outward and against the direction of extent of the second wall 7.

Figure 5:
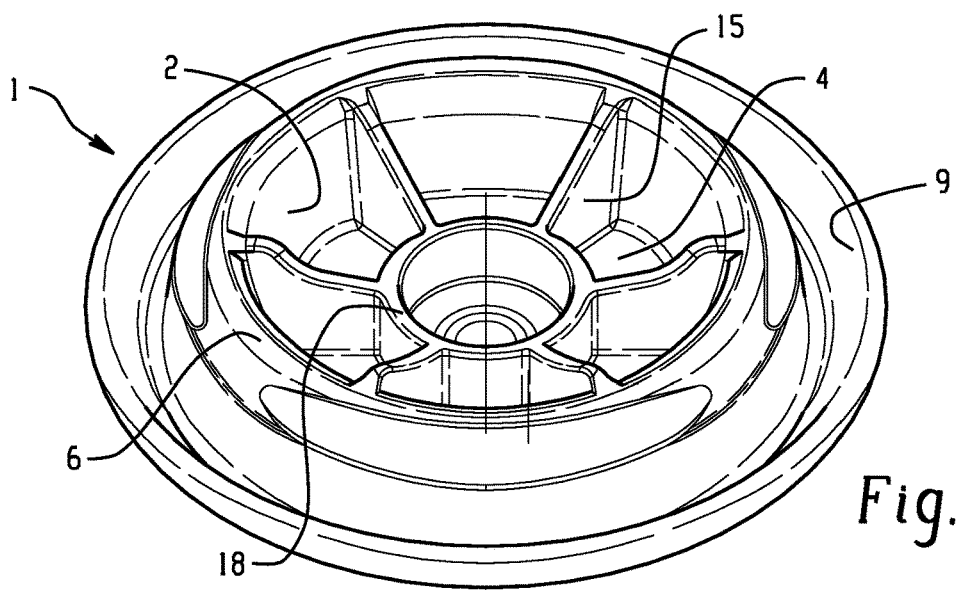
FIG. 5: shows a further embodiment of a plug according to the invention.
Figure 6:
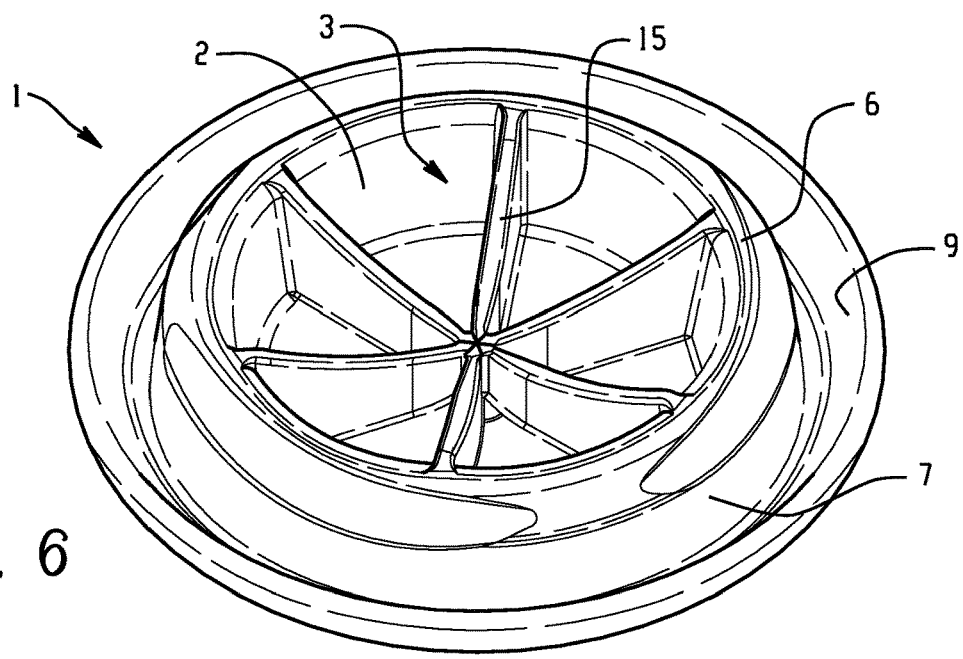
FIG. 6: shows a further embodiment of a plug according to the invention.
Figure 7:
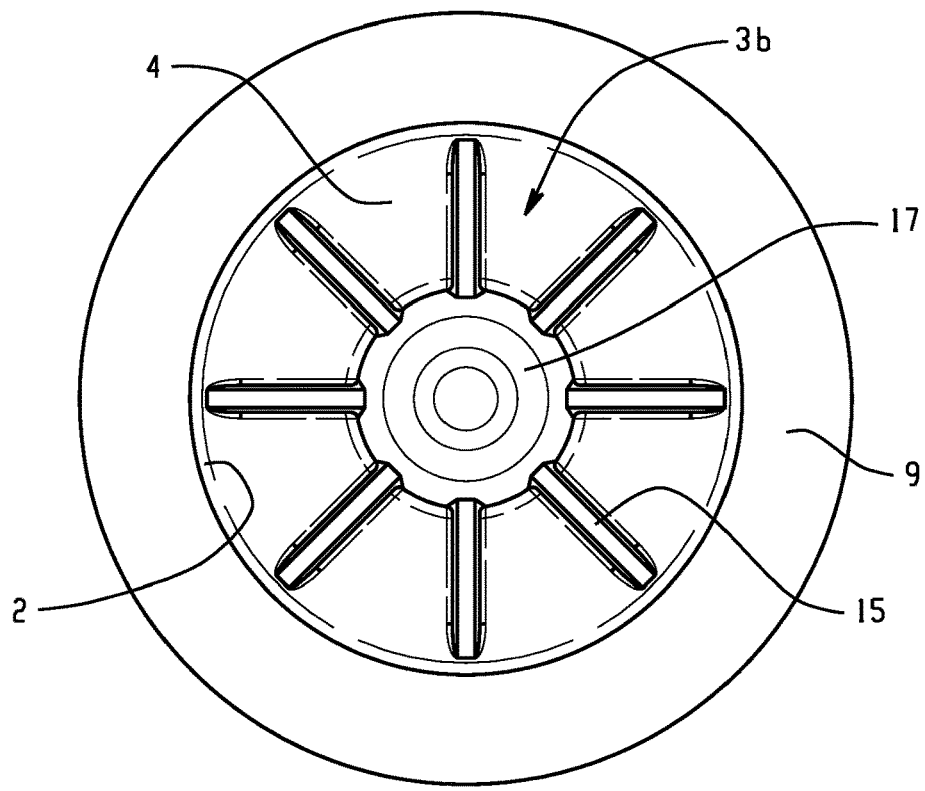
FIG. 7: shows in turn a further embodiment of the plug according to the invention.
Figure 8:
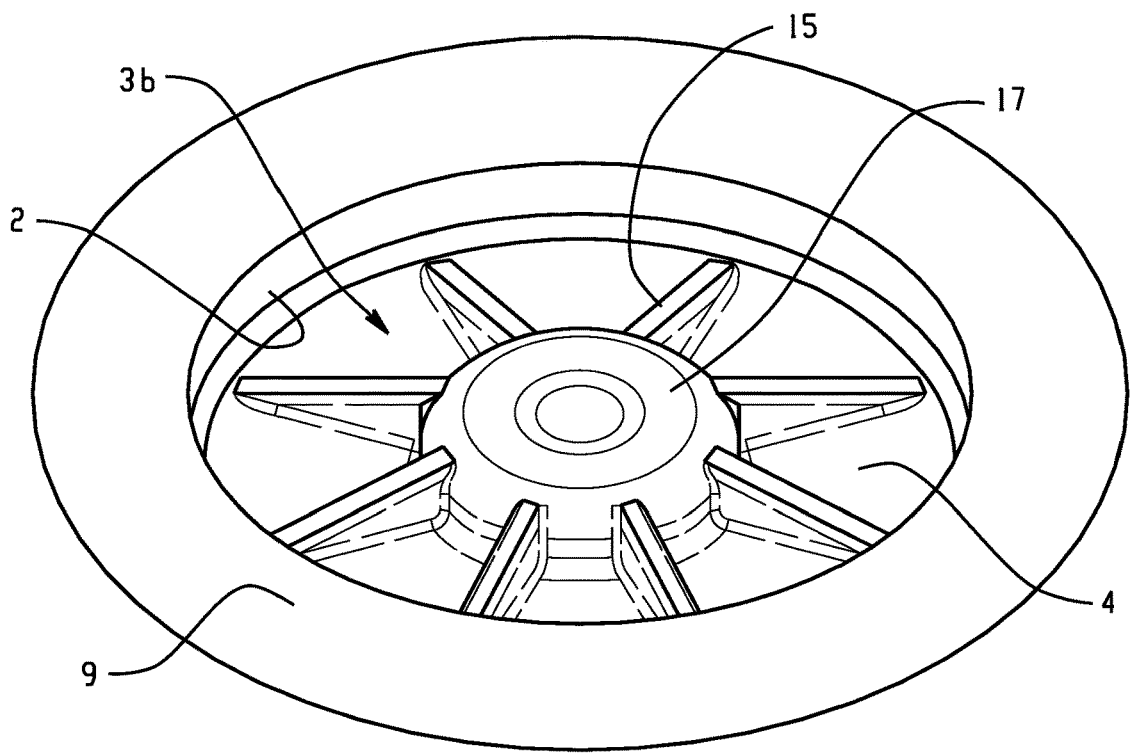
FIG. 8: shows a further embodiment of the plug according to the invention.

A step 10 is arranged in a circumferential manner on the second outer wall 7 and somewhat narrows the second outer wall 7 in this region. The step 10 is optional (it is e.g. not present in FIGS. 5 and 6).

With respect to the axial extent of the second outer wall 7, this step 10 is arranged approximately at the level of a free circumferential edge 11 of the sealing lip 9.

The sealing lip 9, on the one hand, and the step, on the other hand, interact (FIG. 3) with a flat-plate-like body 12, such as a metal sheet, in which there is a hole 13 which is intended to be closed by the closing plug 1.

After the closing plug 1 has been plugged through the hole 13, the sealing lip rests on one side on the flat-plate-like body 12 under a material-related restoring force and it is endeavored to pull the closing plug out of the hole 13 again. The radial pressing of the outer wall 7 by the inside of the hole 13 prevents the plug from being pulled out.

The circumferential step 10 on the outer wall 7 bears here against the opposite lateral surface of the flat-plate-like body 12 and impedes it. This is, however, only necessary if the material and the plug design cannot sufficiently apply radial pressing.

The inner circumferential wall 2 and the outer circumferential wall 7 delimit between them an annular groove 14 which encircles the inner wall 2 and the transverse wall 4.

As a result of this distance between the inner wall 2 and the outer wall 7 and the fact of being formed from an elastic material, the outer wall 7 presses under the restoring force of the elastic material against a circumferential edge of the hole 13 and seals said hole in this way. The inner wall 2 and the outer wall interact here in the manner of a clamping spring.

In this embodiment, the plug 1 preferably has a small radial oversize in relation to the width of the hole 13, in order to bring about a sealing action. Since the plug 1 is produced from an elastic material, it is nevertheless readily possible to plug it through the hole 13.

Figure 9:
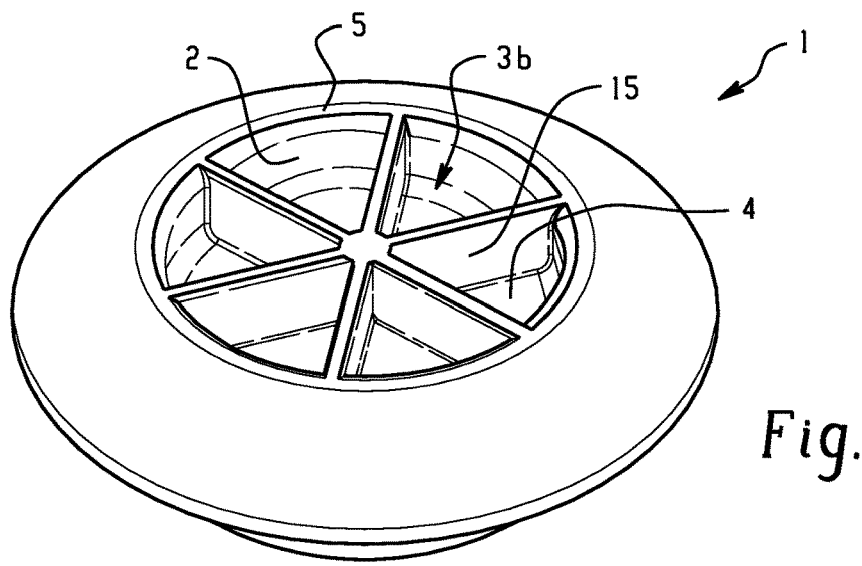
FIG. 9: shows a further advantageous embodiment of the plug according to the invention in a perspective view.
Figure 10:
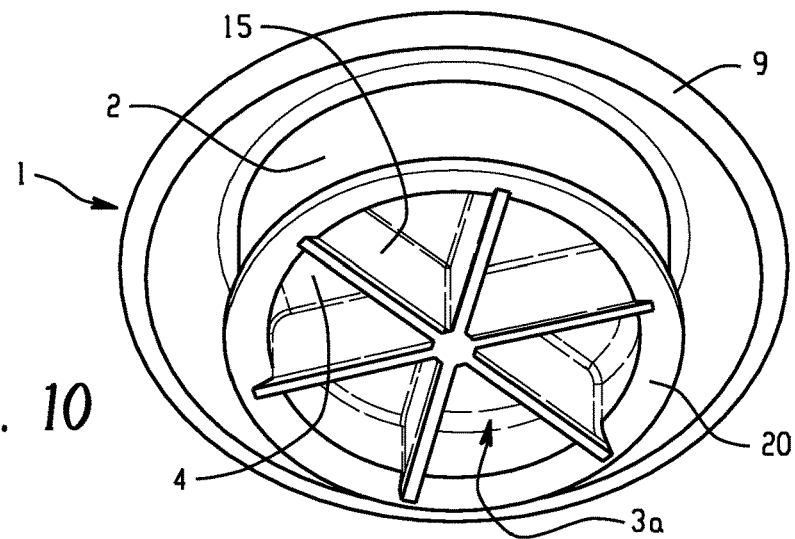
FIG. 10: shows the plug according to FIG. 9 in a perspective view from below.
Figure 12:
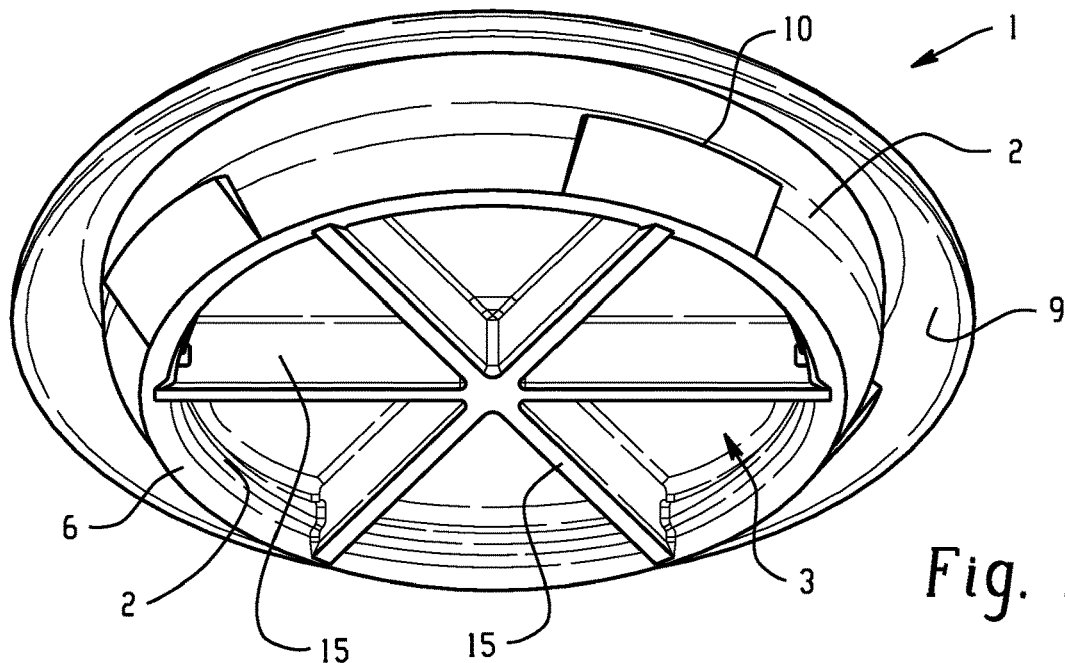
FIG. 12: shows a further embodiment of a closing plug according to the invention with a circumferential wall and with a rib arrangement on one side.
Figure 13:
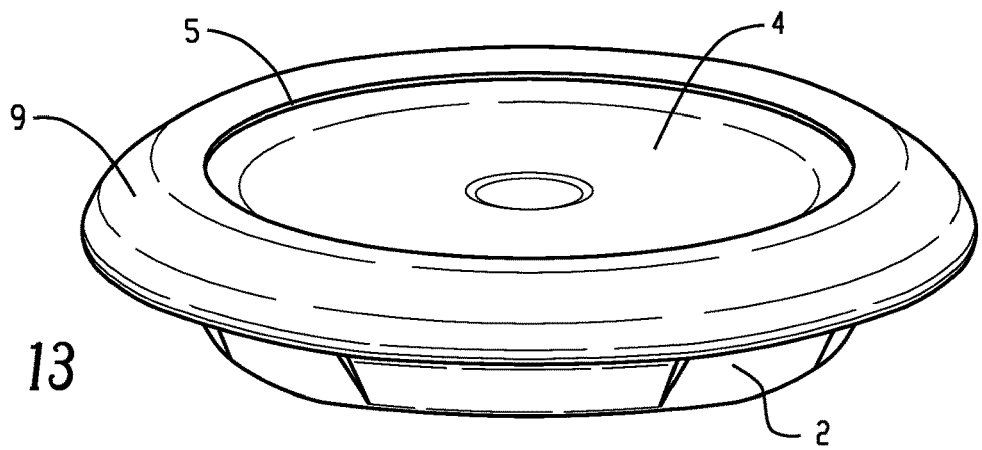
FIG. 13: shows the plug according to FIG. 12 in a side view.
Figure 14:
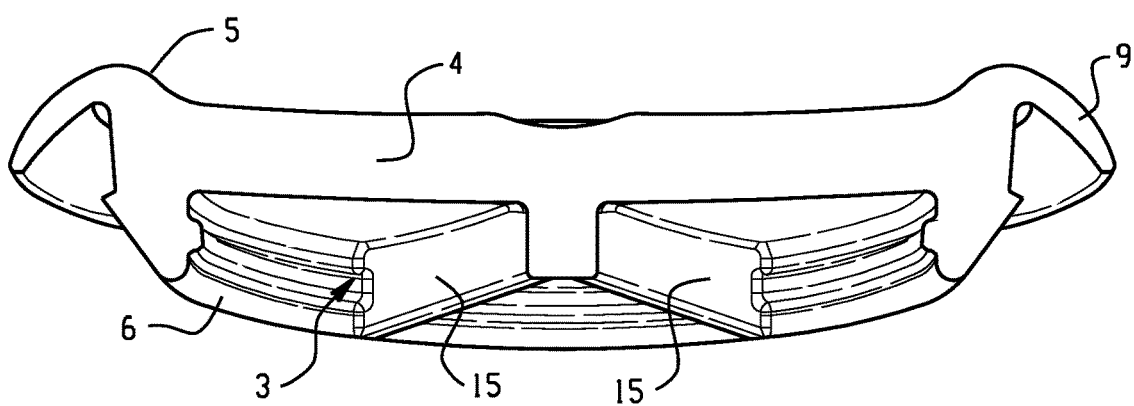
FIG. 14: shows the plug according to FIG. 13 in a sectional perspective view from below.
Figure 15:
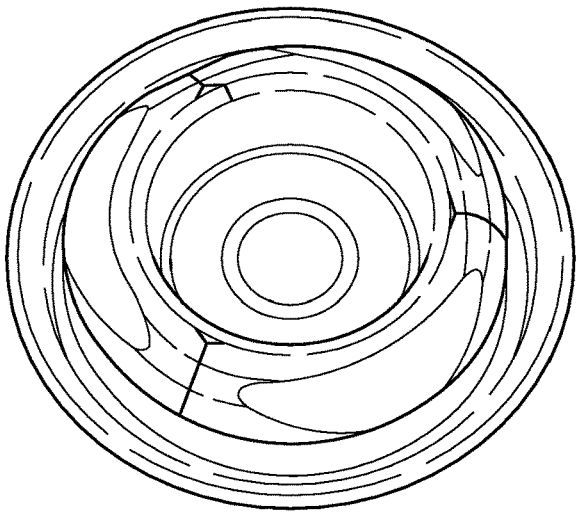
FIGS. 15-19: show a closing plug according to the prior art.
Figure 16:
Figure 17:
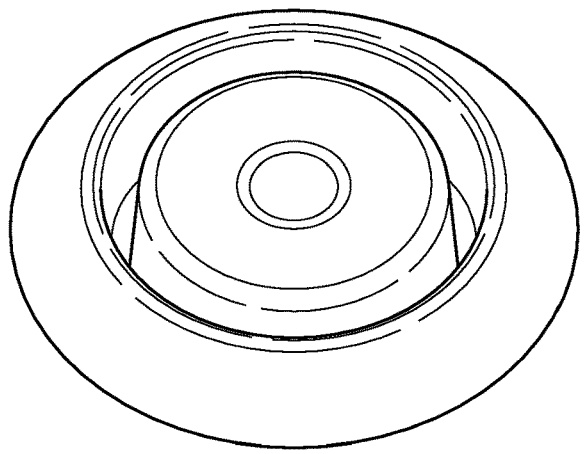
Figure 18:
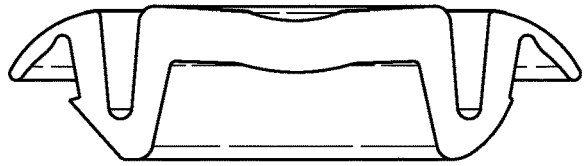
Figure 19:
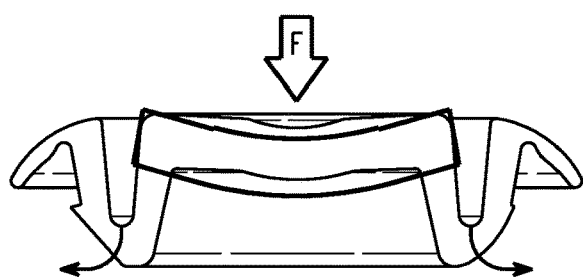

Also in this embodiment, the transverse wall 4 can terminate or substantially terminate between the circumferential edges 5, 6 (FIGS. 9 to 11), but the transverse wall 4 can also terminate or substantially terminate with one of the circumferential edges 5, 6 (FIGS. 12 to 14).

In addition to the bead (20) described, one embodiment can also be formed with a circumferential wall 2 (FIG. 13) having a step 10 projecting radially outward as restraint means preventing the action of pulling-out from an opening 13.

In a further advantageous embodiment, a second outer wall 7 is not present, but a sealing lip 9 branches off from a circumferential edge 5 of the circumferential side wall 2.

As a restraint means which counteracts the pulling-out of the plug, in this embodiment the circumferential edge 6 can be formed with a bead 20 which projects outward and acts in the same way as the step 10 in the embodiment with two walls 2, 7.

For the purpose of reinforcing the plug, at least one reinforcement rib 15 extends transversely through the cavity 3 and is attached here to two opposite regions of the circumferential side wall 2.

In particular, there may also be a plurality of ribs 15 which cross in particular in the region of a longitudinal center axis 16 of the cavity.

In an embodiment of the closing plug 1 in which the transverse wall 4 is arranged in the region of a circumferential edge 5, 6 or terminates with said circumferential edge, the at least one rib 15 extends for example from that surface of the transverse wall 4 which faces the cavity 3 in the direction of the axially opposite circumferential edge 5, 6.

In an embodiment in which the transverse wall 4 subdivides the cavity 3 between the edges 5, 6 in a symmetrical or asymmetrical manner, one of the partial cavities 3a, 3b can have a transverse rib arrangement with at least one rib 15. For the purpose of reinforcement, it can however also be the case that, on each side of the transverse wall 4, the two partial cavities 3a, 3b are formed with a transverse rib arrangement having at least one rib 15.

In a further advantageous embodiment, a central, axial extension 17 is formed in the region of a longitudinal center of the cavity 3, the ribs 15 being formed between said extension and the inner surface of the wall 2.

In a further embodiment (FIG. 5), an annular coaxial rib 18 is arranged coaxially in the cavity 3, the ribs 15 being guided outward radially in relation to the inner surface of the wall 2 from said annular coaxial rib.

The annular rib 18 and/or the central extension 17 can project over a partial quantity of the axial length between the transverse wall 4 and a respective circumferential edge 5, 6 or over the entire height up to the circumferential edge 5, 6 or beyond.

In an embodiment in which the transverse wall 4 subdivides the cavity 3 into partial cavities 3a, 3b in a symmetrical or asymmetrical manner, projections 17 of this type or annular ribs 18 can of course be arranged on each side of the transverse wall 4.

The ribs 15 here can, over their extent, have a uniform height or decrease in height toward a longitudinal center of the cavity 3 (FIG. 6) or decrease in height from an axial center of the cavity 3 toward a circumferential wall 2.

In addition, any intermediate shapes in which the height first decreases and then increases again to the starting value or above it are of course possible.

In an advantageous refinement, the sealing lip 9 is formed at least in subregions from a heat-activatable adhesive material or comprises such a material on a surface which faces a body 12, in order to adhesively bond the sealing lip 9 and the body 12 given suitable heat treatment.

In addition, a method for producing an abovementioned closing plug by means of a 2-component injection molding method is provided.

According to a further advantageous embodiment, the closing plug is provided for closing holes in objects, in particular for closing holes in vehicle bodies, wherein the closing plug 1 has at least one first circumferential wall 2 which encloses a cavity 3, wherein a transverse wall 4 is present in the cavity 3 between the circumferential side wall 2, which transverse wall has an outer shape which corresponds to the shape of the cavity 3 and is attached to the side wall 2 in a circumferential manner.

This closing plug can comprise the abovementioned features in combination with their technical effect.

The closing plug is distinguished in that it is formed as a 1-component structural part in one piece or completely from a heat-activatable adhesive material.

A TPE material and/or a material having adhesive properties at relatively high temperatures of e.g. 110° C. to 195° C. is provided as the heat-activatable adhesive material for the 1-component adhesive closing plug.

The adhesive properties are provided at temperatures of 110° C. or 120° C. or 130° C. or 140° C. or 150° C. The adhesive properties are provided at temperatures up to 155° C. or 165° C. or 175° C. or 185° C. or 195° C.

Furthermore, a closing plug is provided which is produced from a heat-activatable adhesive material by a 1-component injection molding method.

In particular, a method for producing a closing plug by means of a 1-component injection molding method from a heat-activatable adhesive material is also provided.

In the invention, it is advantageous that, as a result of the arrangement of a transverse rib arrangement with at least one rib inside a cavity of a closing plug, an inner circumferential wall which delimits the cavity and a transverse wall of the plug are reinforced such that, when being pressed into an opening to be closed, on the one hand, or when being pressed out of this opening, the plug is not elastically deformed to such an extent that relatively large forces counteract assembly or disassembly. During assembly, as a result of the spreading of the wall 7 the forces are lower, and, during disassembly, as a result of the stiffening the wall can contract inward to a smaller extent, and the result is thus an improved holding action.

What is claimed is:

1. A closing plug for closing holes in vehicle bodies, wherein the closing plug has a circumferential wall which encloses a cavity, wherein a transverse wall is present in the cavity between the circumferential wall, which transverse wall has an outer shape which corresponds to the shape of the cavity and is attached to the circumferential wall in a circumferential manner;

wherein the circumferential wall is an inner circumferential wall, wherein the inner circumferential wall includes axially opposite first and second circumferential edges, wherein the transverse wall is attached to the inner circumferential wall in a region of the first circumferential edge, and wherein an outer circumferential wall branches off from the second circumferential edge of the inner circumferential wall obliquely outward in the direction of the first circumferential edge, said outer circumferential wall diverging from the inner circumferential wall;

wherein the inner circumferential wall and the outer circumferential wall are substantially the same height;

wherein, for the purpose of reinforcing the inner circumferential wall against yielding outward or inward, at least one reinforcement rib extends transversely through and fully across the cavity so as to connect opposite regions of the inner circumferential wall.

2. The closing plug as claimed in claim 1, wherein the closing plug is formed as a 1-component structural part composed of a heat-activatable adhesive material.

3. The closing plug as claimed in claim 2, wherein the heat-activatable adhesive material comprises a TPE material.

4. The closing plug as claimed in claim 2, wherein there are a plurality of reinforcement ribs.

5. The closing plug as claimed in claim 1, wherein a sealing lip branches off from a free end edge of the outer circumferential wall obliquely outward and against a direction of extent of the outer circumferential wall.

6. A closing plug for closing holes in vehicle bodies, wherein the closing plug comprises:

an inner circumferential wall with a first and second axially opposite circumferential edges, wherein the inner circumferential wall encloses a cavity, wherein a transverse wall is located in the cavity between the inner circumferential wall, which transverse wall has an outer shape which corresponds to the shape of the cavity and is attached to the inner circumferential wall in a circumferential manner in a region of the first circumferential edge;

wherein an outer circumferential wall extends from the second circumferential edge and obliquely outward in a direction of the first circumferential edge, such that the outer circumferential wall diverges from the inner circumferential wall;

wherein, for stiffening of the inner circumferential wall, at least one reinforcement rib extends within the cavity, wherein the at least one reinforcement rib includes a first free axial end edge that is at an axial location adjacent an axial location of the second circumferential edge of the inner circumferential wall;

wherein the inner circumferential wall and the outer circumferential wall are substantially the same height;

wherein the closing plug is formed as a 1-component structural part composed of a heat-activatable adhesive material.

7. The closing plug of claim 6,
wherein the at least one reinforcement rib includes a second axial end edge connected to the transverse wall.

* * * * *